United States Patent [19]

Kani

[11] Patent Number: 5,098,758

[45] Date of Patent: Mar. 24, 1992

[54] RESIN MOLD CLUTCH FACING

[75] Inventor: Harunobu Kani, Toyota, Japan

[73] Assignee: Toyota Jidosha Kabushiki Kaisha, Toyota, Japan

[21] Appl. No.: 536,309

[22] Filed: Jun. 11, 1990

[30] Foreign Application Priority Data

Jun. 12, 1989 [JP] Japan ................... 1-148777

[51] Int. Cl.⁵ ................... D04H 3/02; F16D 11/00; B32B 3/02; B32B 5/16
[52] U.S. Cl. ................... 428/37; 192/107 M; 192/107 R; 428/65; 428/137; 428/222; 428/284; 428/285; 428/286; 428/288; 428/298; 428/302; 428/323; 428/327; 428/331; 428/340; 428/402; 428/902
[58] Field of Search ............... 192/107 M, 107 R; 523/149, 155, 153; 428/338, 323, 37, 65, 137, 222, 284, 285, 286, 298, 302, 323, 327, 331, 340, 402, 902

[56] References Cited

U.S. PATENT DOCUMENTS

| | | |
|---|---|---|
| 4,244,994 | 1/1981 | Trainor et al. |
| 4,320,823 | 3/1982 | Covaleski ................... 428/323 |
| 4,324,706 | 4/1982 | Tabe et al. ................... 523/149 |
| 4,349,595 | 10/1982 | Trainor et al. ................... 192/107 M |
| 4,476,256 | 10/1984 | Hamermesh . |
| 4,563,386 | 1/1986 | Schwartz ................... 428/338 |
| 4,656,203 | 4/1987 | Parker . |
| 4,663,368 | 5/1987 | Harding et al. ................... 192/107 M |
| 4,722,949 | 2/1988 | Horiguchi et al. ................... 523/155 |
| 4,735,975 | 4/1988 | Iwata et al. ................... 523/155 |
| 4,735,975 | 4/1988 | Iwata et al. . |
| 4,775,705 | 10/1988 | Parker et al. ................... 192/107 M |
| 4,777,193 | 10/1988 | Kani ................... 523/155 |

FOREIGN PATENT DOCUMENTS

| | | |
|---|---|---|
| 0129022 | 12/1984 | European Pat. Off. . |
| 1128359 | 9/1968 | United Kingdom . |
| 1128360 | 9/1968 | United Kingdom . |
| 1207087 | 9/1970 | United Kingdom . |
| 1290553 | 9/1972 | United Kingdom . |
| 1545081 | 5/1979 | United Kingdom . |
| 2196977 | 5/1988 | United Kingdom . |
| 2204924 | 11/1988 | United Kingdom . |

OTHER PUBLICATIONS

U.S. patent application Ser. No. 155,059, filed Feb. 11, 1988, located in Group Art Unit 153.
U.S. patent application Ser. No. 469,680, filed Jan. 25, 1990, located in Group Art Unit 154.

Primary Examiner—George F. Lesmes
Assistant Examiner—James D. Withers
Attorney, Agent, or Firm—Finnegan, Henderson, Farabow, Garrett & Dunner

[57] ABSTRACT

Disclosed is a resin mold clutch facing integrally heat molded out of a resin mold base member and a backup member. The resin mold base member consists essentially of a matrix composed of from 10 to 20 volume % of a glass fiber, from 5 to 30 volume % of at least one heat resistance organic fiber, and from 5 to 25 volume % of at least one heat resistance inorganic fiber, based on the total volume of the resin mold base member, an inorganic filler, a solid lubricant, and a resin binder. In the resin mold clutch facing, the heat resistance inorganic fiber works to suppress the plastic flow resulting from the softening of the glass fiber at a high temperature and under a high bearing pressure. Thus, the resin mold clutch facing comes to have improved and excellent friction and anti-wear properties at a high temperature, and a long life accordingly.

14 Claims, 3 Drawing Sheets

RESIN MOLD CLUTCH FACING

BACKGROUND OF THE INVENTION

1. Field of the Invention

This invention relates to an improvement on a clutch facing of a clutch disk, used in an automobile, for connecting and disconnecting the power transmission, and particularly relates to a resin mold clutch facing having lower specific gravity, high strength, and good friction and anti-wear properties at a high temperature.

2. Discussion of the Background

An automobile employs a clutch facing as one of the components of a clutch disk for connecting and disconnecting the power transmission between the engine and the gearbox.

The followings have been known as the clutch facing: a woven clutch facing, a semi-mold clutch facing, and a resin mold clutch facing.

The woven clutch facing is formed by winding a string shaped fiber, which has been impregnated with a resin in advance, in a spiral shape, and thereafter by molding the string shaped fiber into a desired shape.

The semi-mold clutch facing is formed by winding a string shaped fiber, which has been impregnated with a resin and a rubber, in a spiral shape, and thereafter by molding the string shaped fiber into a desired shape.

The resin mold clutch facing is formed by dry-mixing a short fiber as a matrix, a resin and additives, and thereafter molding the mixture into a desired shape. Hereinafter, the short fiber means a discontinuous fiber or filament of an interrupted length.

However, as to the woven clutch facing and the semi-mold clutch facing, the additives should be impregnated into the string shaped fiber, and the types and the amounts of the additives are limited. As to the semi-mold clutch facing, the additives have been mixed with the rubber and impregnated into the string shaped fiber, thereby increasing the contents of the additives and improving the anti-wear property. However, no further improvement on the performance can be expected because the current mixing amounts of the additives have nearly reached the limitation.

On the other hand, as to the resin mold clutch facing, it is easy to add the additives to the mixture and to improve the friction property because the components of the mixtures are dry-mixed and molded. Therefore, the improvements on the resin mold clutch facing is the current trend in the field of the clutch facing development.

The resin mold clutch facing has a uniform friction property because it has a uniform composition in any part thereof. On the contrary, the resin mold clutch facing has a problem on the shear strength. Namely, the resin mold has low shear strength because the fibers thereof do not have a uniform orientation. Accordingly, the resin mold clutch facing has a problem on the burst strength, namely the resin mold clutch facing has low revolution per minute (hereinafter referred to as rpm) at burst. Here, the rpm at burst means the rpm at which a clutch facing bursts. That is, the clutch facing is rotated at high speeds while gradually increasing the rpm until the clutch facing bursts. Therefore, the clutch facing is judged to be superior in the strength when it shows higher rpm at burst.

U.S. Pat. No. 4,244,944 discloses a laminated aramid fiber friction member having two-layer structure, comprising a base member and a backup member, similarly to the present invention. However, the laminated friction member has following two problems.

a) Coupling strength is weakened at a high temperature since the member contains rubber component.

b) The volume percentage between the glass fiber and the polyamind fiber in the base member is different from that in the backup member, in other words, the volume percentage of glass is larger than that of polyamid in the base member, however, the volume percentage of glass is smaller than that of polyamid in the backup member. Therefore, warpage may be occured owing to the difference of their coefficient expansion, during the operation.

We, the inventors of the present invention, had proposed a resin mold clutch facing in Japanese Unexamined Patent Publication (KOKAI) No. 203936/1988 to solve the above-mentioned problems.

The resin mold clutch facing set forth in the publication is integrally heat molded out of a resin mold base member forming a friction face, and a backup member. The resin mold base member consists essentially of a matrix composed of a glass fiber and an aromatic polyamide fiber, an inorganic filler, a solid lubricant, and a resin binder. The backup member consists essentially of a matrix composed of a glass strand or yarn and at least one strand or yarn selected from a group consisting of a rayon strand or yarn and an aromatic polyamide strand or yarn, and a binder adhered to the matrix, and is shaped in an spirally wound configuration. Hereinafter, the strand or yarn means a bundle of continuous fibers or filaments of an uninterrupted length.

The weight of the resin mold clutch facing has been reduced and the strength thereof has been increased because a certain amount of the glass fiber has been substituted by the aromatic polyamide fiber having low specific gravity and high strength. Moreover, the strength of the resin mold clutch facing has been further increased because the backup member is shaped in a spirally wound configuration.

Further, because the glass fiber constituting the matrix of the resin mold base member has a softening point of from 700° to 850° C., the glass fiber softens at about 700° C. or more and forms a heat resistance protective coat on the friction face of the resin mold base member. On the other hand, however, the strength of the glass fiber decreases remarkably when the temperature of the operating resin mold clutch facing reaches the softening point. Hence, the resin mold clutch facing set forth wears, and is not so excellent in the anti-wear property.

SUMMARY OF THE INVENTION

It is therefore an object of the present invention to provide a resin mold clutch facing having improved friction and anti-wear properties at a high temperature.

The above and other objects are achieved by a resin mold clutch facing according to the present invention. The resin mold clutch facing is integrally heat molded out of a resin mold base member forming a friction face, and a backup member. The resin mold base member consists essentially of a matrix composed of from 10 to 20 volume % of a glass fiber, from 5 to 30 volume % of at least one heat resistance organic fiber selected from a group consisting of a polyamide fiber, a polyamide fiber, an aromatic polyamide fiber and a polybenzoimidazole fiber, and from 5 to 25 volume % of at least one heat resistance inorganic fiber selected from a group consisting of a potassium titanate fiber, a ceramic fiber, a quartz fiber and a glassy silica fiber, based on the total volume of the resin mold base member, an inorganic filler, a solid lubricant, and a resin binder.

The matrix of the resin mold base member is composed of a glass fiber, at least one heat resistance organic fiber and at least one heat resistance iorganic fiber. It is preferred that the fiber configuration employed in the matrix is a short fiber, i.e., a discontinuous fiber or filament of an interrupted length, in view of the moldability.

The content of the glass fiber may be from 10 to 20 volume % based on the total volume of the resin mold base member. The glass fiber has the softening temperature of from 700° to 850° C. The glass fiber softens at about 700° C. or more, thereby forming a heat resistance protective coat on the friction face of the resin mold base member.

The heat resistance organic fiber may be polyamide fiber, a polyamide fiber, an aromatic polyamide fiber, a polybenzoimidazole fiber, or the mixtures thereof. The content of the heat resistance organic fiber may be from 5 to 30 volume % based on the total volume of the resin mold base member. The heat resistance organic fiber works to suppress the following properties of the glass fiber, i.e., the hardness thereof and the friction coefficient ($\mu$) thereof likely to fluctuate at a low temperature.

The heat resistance inorganic fiber may be a potassium titanate fiber, a ceramic fiber, a quartz fiber, a glassy silica fiber or the mixtures thereof. There are conditional limitations on the softening of the glass fiber and the formation of the heat resistance protective coat, and the wear due to the plastic flow increases sharply because the glass fiber softens remarkably at a high rotating speed and under a high bearing pressure. The heat resistance inorganic fiber suppresses the plastic flow, thereby preventing the wear from increasing sharply. It is preferred that the heat resistance inorganic fiber is not so hard, but has a fibrous configuration and a heat resistance property. Particularly, a potassium titanate fiber is preferred because it works more effectively in a high temperature range than in a low temperature range. The content of the heat resistance inorganic fiber may be from 5 to 25 volume % based on the total volume of the resin mold base member. When the content of the heat resistance inorganic fiber is less than 5 volume %, it is not possible to prevent the glass fiber from softening. When the content of the heat resistance inorganic fiber is more than 25 volume %, it is hard to form the heat resistance protective coat.

As the inorganic filler constituting the resin mold base member, two types of fillers, i.e., a soft filler such as calcium carbonate and a hard filler such as zirconium silicate, may be used in order to make the securing of the friction coefficient ($\mu$) of the resin mold base member compatible with the attack tendency thereof against the mating component. It is preferred that the average grain diameter of the hard filler is from 50 to 500 micrometers in view of the friction coeffcient ($\mu$) securing and the improvement on the anti-wear property at a high rotating speed.

In addition to the calcium carbonate and the zirconium silicate, calcium hydroxide may be added to improve the rust resistance property. Further, diatomaceous earth, clay and alumina may be added as a friction regulating agent. It is preferred to set the content of the inorganic filler from 5 to 15 volume % based on the total volume of the resin mold base member.

As the solid lubricant constituting the resin mold base member, graphite, molybdenum disulfide, lead sulfide, and antimony trisulfide may be used. Among the solid lubricants, the employment of granular graphite is particularly preferable. It is preferred to set the content of the solid lubricant from 5 to 20 volume % based on the total volume of the resin mold member.

As the resin binder constituting the resin mold base member, a thermosetting resin, such as a phenol resin, an epoxy resin, and an unsaturated polyester resin, and a phenoxy resin may be used. Among the resins, it is most preferrable to use a phenol resin. It is further preferred to set the content of the resin binder from 15 to 30 volume % based on the total volume of the resin mold base member.

As the other components of the resin mold base member, friction regulating agents may be used in an amount from 1 to 8 volume % based on the total volume of the resin mold base member. The friction regulating agents may be an organic powder such as cashew dust, rubber dust and elastomer, and a metal powder such as an aluminium powder, an iron powder and a zinc powder.

When molding the resin mold clutch facing, the resin mold base member may be heat-molded integrally with the backup member in a mold after mixing the matrix, the inorganic filler, the solid lubricant and the resin binder and pre-molding the mixture. Or the resin mold base member may be heat-molded integrally with the backup member after placing the backup member at a predetermined position in a mold and filling the resin mold base member in the mold.

The backup member may consist essentially of a matrix composed of a glass strand or yarn and a heat resistance organic strand or yarn and a binder composed of a resin and a rubber adhered to the matrix, and the matrix may be shaped in a spirally wound configuration. For instance, a binder composed of a phenol resin and a rubber is prepared and impregnated into a matrix. The binder is thus adhered to the aforementioned string-shaped matrix. The binder increases the binding force of the string-shaped matrix and renders the backup member flexible. Further, the backup member may be formed in the following manner: A string with a binder adhered thereto may be wound into a spirally wound configuration, and shaped into a backup member of a predetermined shape.

The backup member may be composed of from 20 to 60 volume % of a glass strand or yarn, from 20 to 80 volume % of a heat resistance organic strand or yarn, from 10 to 25 volume % of a resin, and from 5 to 25 volume % of a rubber based on the total volume of the backup member.

The heat resistance organic strand or yarn employed in the backup member may preferably be the same kind of the heat resistance organic fiber employed in the resin mold base member. When such a heat resistance organic strand or yarn is employed in the backup member, the matrix of the backup member comes to have a component combination similar to that of the matrix of the resin mold base member. Hence, it is possible to prevent the resin mold clutch facing from warping. The warping is caused by the heat shrinkage rate difference resulting from the employment of different components in the backup member and the resin mold base member.

When molding a resin mold clutch facing, the backup member may be held, for instance, in a mold together with the resin mold base member under a heated and pressurized condition. If necessary, the molded substance thus molded is heat-treated at the temperature of from 200° to 280° C. for from 3 to 6 hours and thereafter ground to obtain the resin mold clutch facing of the present invention.

The resin mold clutch facing of the present invention is integrally heat molded out of the resin mold base member and the backup member. The resin mold base member consists essentially of a matrix composed of from 10 to 20 volume % of a glass fiber, from 5 to 30 volume % of at least one heat resistance organic fiber, and from 5 to 25 volume % of at least one heat resistance inorganic fiber, an inorganic filler, a solid lubricant, and a resin binder.

In the thus arranged resin mold clutch facing of the present invention, the glass fiber, the heat resistance organic fiber and the heat resistance inorganic fiber work in the following manner as the operation temperature of the resin mold clutch facing increases.

In the temperature range lower than about 400° C., the heat resistance organic fiber mitigates the hardness of the glass fiber, and suppresses the fluctuation of the friction coefficient ($\mu$) of the glass fiber. In the temperature range higher than about 400° C., the glass fiber exhibits its characteristics effectively. Especially, in the temperature range higher than about 700° C., the glass fiber softens, thereby forming a heat resistance protective coat on the friction face of the resin mold base member. This arrangement results in the improvement on the life of resin mold clutch facing accordingly.

However, there is a limitation on the formation of the heat resistance protective coat. Namely, the glass fiber softens remarkably at a high rotating speed and under a high bearing pressure, and accordingly the wear due to the plastic flow increases sharply. Hence, the heat resistance inorganic fiber suppresses the plastic flow, thereby preventing the wear from increasing sharply.

Thus, the resin mold clutch facing of the present invention comes to have improved and excellent friction and anti-wear properties at a high temperature because the heat resistance inorganic fiber works to suppress the plastic flow resulting from the softening of the glass fiber at a high rotating speed and under a high bearing pressure.

BRIEF DESCRIPTION OF THE DRAWINGS

A more complete appreciation of the present invention and many of the attendant advantages thereof will be readily obtained as the same because better understood by reference to the following detailed description when considered in connection with the accompanying drawings, wherein.

DETAILED DESCRIPTION OF THE PREFERRED EMBODIMENT

Figure 1:
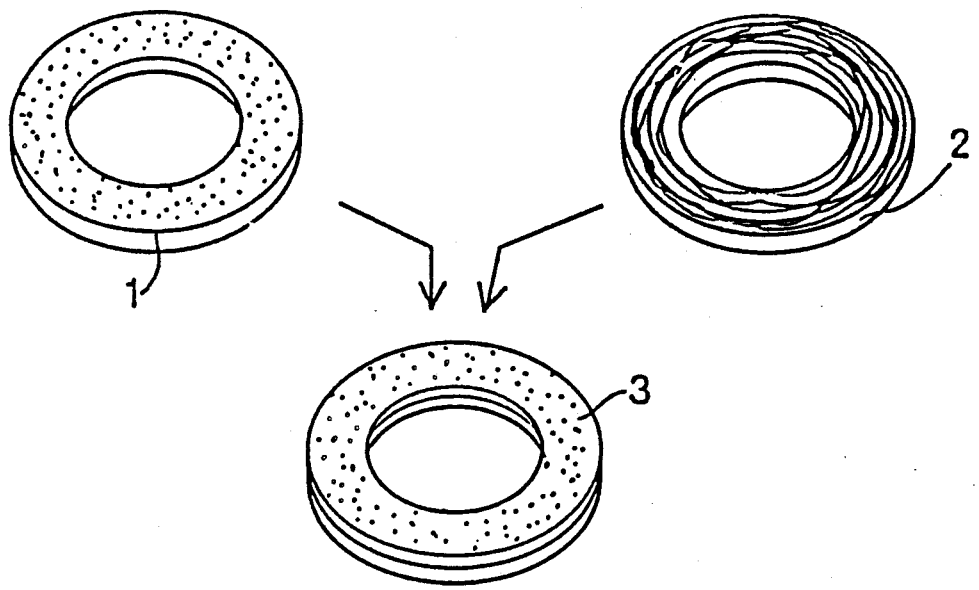
FIG. 1 is a perspective view of a resin mold clutch facing according to the present invention.

Having generally described this invention, a further understanding can be obtained by reference to certain specific preferred embodiments which are provided herein for purpose of illustration only and are not intended to be limiting unless otherwise specified.

The present invention will be hereinafter described in detail with reference to preferred embodiments. Unless otherwise specified, percentages appearing in the following description mean the percentage by volume.

EXAMPLE 1

A resin mold clutch facing of Example 1 was manufactured as follows:

Resin Mold Base Member Preparation

In order to obtain a pre-molded substance 1 to be a resin mold base member, the following materials were dry-mixed by the following contents based on the total volume of the resin mold base member and pre-molded in a mold for molding the pre-molded substance 1 at the room temperature and under the pressure of from 100 to 300 kgf/cm$^2$:

- a matrix composed of 15% of a glass fiber having the diameter of 10 micrometers and the length of 3 mm; 20% of an aromatic polyamide fiber (#29 Kevlar, trade mark) having the diameter of 12 micrometers and the length of 3 mm as a heat resistance organic fiber; and 5% of a potassium titanate fiber having the diameter of 0.2–0.5 micrometers and the length of 5–20 micrometers as a heat resistance inorganic fiber;
- 15% of zirconium silicate having the average grain diameter of from 50 to 500 micrometers as a hard inorganic filler; and calcium carbonate having the average grain diameter of 0.5–5 micrometers as a soft inorganic filler;
- 15% of granular graphite having the average grain diameter of 20–50 micrometers as a solid lubricant;
- 25% of a phenol resin as a resin binder;
- 5% of cashew dust having the average grain diameter of 50–100 micrometers as a friction regulating agent.

Backup Member Preparation

A binder mixture was prepared by mixing 15% of a phenol resin and 10% of styrene-butadiene rubber (SBR) based on the total volume of a backup member, and the mixture was impregnated into a matrix composed of 40% of glass roving having the diameter of 10 micrometers, and 35% of an aromatic polyamide strand or yarn having the diameter of 12 micrometers based on the total volume of a backup member. Then, the matrix was bundled together and spinned or twisted to obtain a string. Finally, then, the string was spirally wound to form a backup member 2.

Molding

The molding was performed at the temperature of from 140° to 170° C. and under the pressure of from 100 to 300 kgf/cm² after integrally placing the pre-molded substance 1 to be a resin mold base member and the backup member 2 in a mold. Thus, the pre-molded substance 1 and the backup member 2 were made into an integrally molded substance. Then, the integrally molded substance was heat-treated at the temperature of from 200° to 280° C. for from 3 to 6 hours and ground to obtain a resin mold clutch facing 3 of Example 1. The resin mold clutch facing 3 of Example 1 had the outside diameter of 236 mm, the inside diameter of 150 mm and the thickness of 3.5 mm.

EXAMPLES 2 and 3

Resin mold clutch facings of Examples 2 and 3 were manufactured in the same manner as Example 1 except for employing the compositions set forth in Table.

TABLE

| Members | Components | Examples (Vol. %) 1 | 2 | 3 | Comparative Examples (Vol. %) 1 | 2 |
|---|---|---|---|---|---|---|
| Resin Mold Base Member | Glass Fiber | 15 | 14 | 13 | 20 | 10 |
| | Heat Resistance Organic Fiber | 20 | 18 | 15 | 24 | 15 |
| | Heat Resistance Inorganic Fiber | 5 | 15 | 25 | 0 | 30 |
| | Inorganic Filler | 15 | 12 | 10 | 13 | 7 |
| | Solid Lubricant | 15 | 11 | 9 | 13 | 8 |
| | Resin Binder | 25 | 25 | 24 | 25 | 25 |
| | Friction Regulating Agent | 5 | 5 | 4 | 5 | 5 |
| Backup Member | Glass Roving | 40 | 40 | 25 | 65 | 0 |
| | Heat Resistance Organic Strand or Yarn | 35 | 35 | 50 | 15 | 85 |
| | Resin | 15 | 15 | 15 | 15 | 13 |
| | Rubber | 10 | 10 | 10 | 5 | 2 |
| Results of Backup Member Evaluation | RPM at Burst | ○ | ○ | ⊙ | x | ⊙ |
| | Moldability | ○ | ○ | Δ | x | x |
| | Deformation | ○ | ○ | Δ | Δ | Δ |
| | Cost | ○ | ○ | Δ–○ | ○ | x |

COMPARATIVE EXAMPLES 1 and 2

Resin mold clutch facings of Comparative Examples 1 and 2 were manufactured in the same manner as Example 1 except for employing the compositions set forth in Table.

EVALUATION 1

The relationships between the contents of the heat resistance inorganic fiber in the resin mold base member and the relationships between the contents thereof and the minimum friction coefficient ($\mu$) were investigated on the five facings, namely Examples 1-3 and Comparative Examples 1 and 2 by using a clutch dynamometer. The results are shown in FIG. 2.

Figure 2:
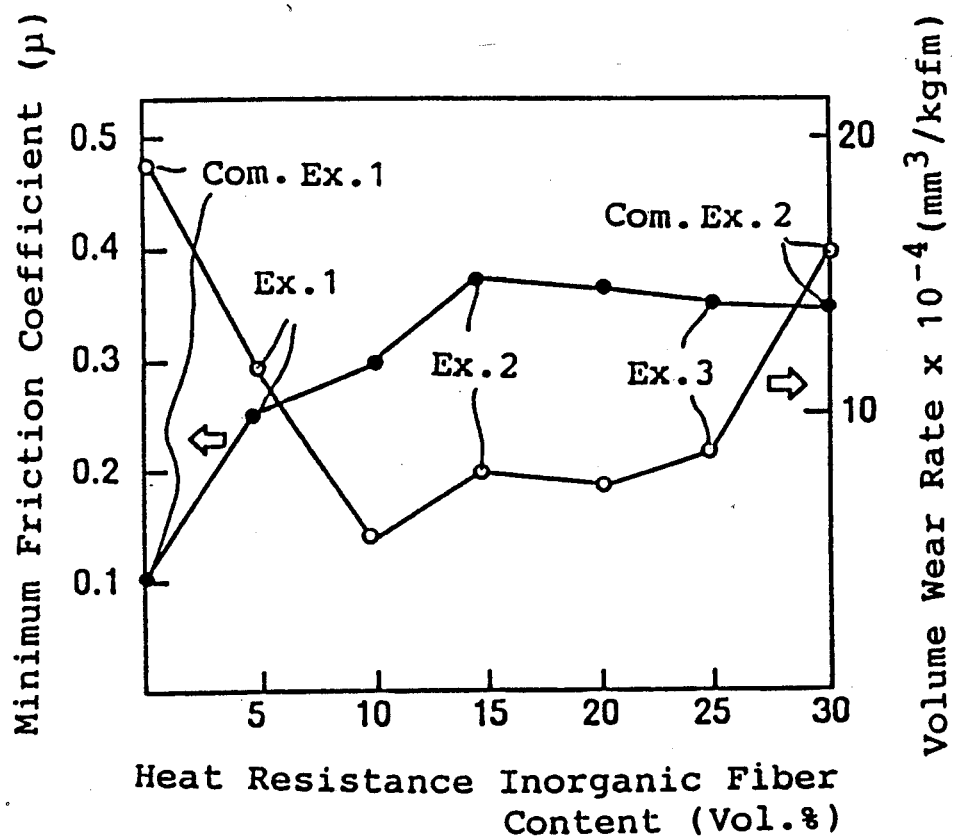
FIG. 2 is a line chart showing the relationship between the contents of the heat resistance inorganic fiber in the resin mold base member and the minimum friction coefficient ($\mu$) and the relationship between the contents thereof and the volume wear rate, and the relationships are plotted for the resin mold clutch facings of Examples 1-3 according to the present invention and Comparative Examples 1 and 2.

In FIG. 2, the black circles (●) show the minimum friction coefficients ($\mu$) and the white circles (○) show the volume wear rates. These investigations were conducted by using a clutch dynamometer under the following conditions:
No. of Revolutions per Minute: 2500 rpm
Moment of Inertia: 0.18 kgfms²
Testing Temperature: 250° C.
No. of Clutchings: 1000.

It is readily understood from FIG. 2 that the minimum friction coefficient ($\mu$) is larger than 0.25 and the volume wear rate is smaller than $12 \times 10^{-4}$ mm³/kgfm when the content of the heat resistance inorganic fiber falls in the range of from 5 to 25%, and that the values are favorable in the range.

EVALUATION 2

The following performance tests were conducted by using a clutch dynamometer for the resin mold clutch facings of Example 2 and Comparative Example 2.

VOLUME WEAR RATE

Volume wear rate was measured by using a clutch dynamometer under the following conditions:
No. of Revolutions per Minute: 4000 rpm
Moment of Inertia: 0.07 kgfms²
Testing Temperature: 200° C.
Load on Clutch Cover: 400 kgf and 600 kgf.
The results are shown in FIG. 3.

Figure 3:
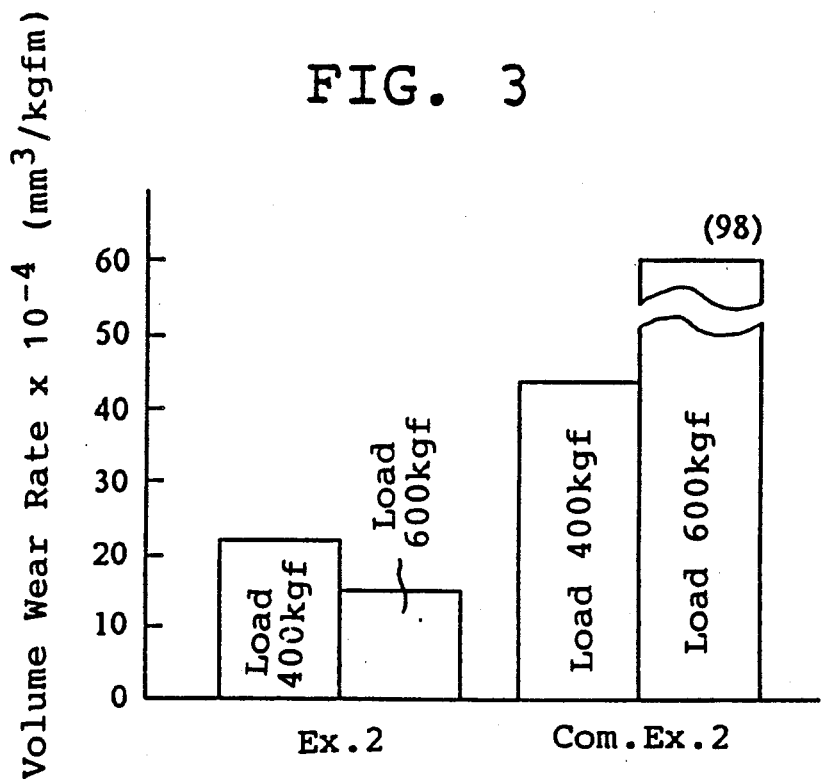
FIG. 3 is a column chart showing the results of the volume wear rate measurement which was carried out on the resin mold clutch facings of Example 2 according to the present invention and Comparative Example 2 by using a clutch dynamometer.

It is readily understood from FIG. 3 that the volume wear rate of the resin mold clutch facing of Example 2 is about half of that of Comparative Example 2 when the load on clutch cover is 400 kgf.

In particular, when the load on clutch cover is 600 kgf, the wear resistance property of the resin mold clutch facing of Example 2 is at least as sixth times as much as that of Comparative Example 2.

MINIMUM FRICTION COEFFICIENT

The minimum friction coefficient ($\mu$) was measured by using a clutch dynamometer under the following conditions:
No. of Revolutions per Minute: 4000 rpm
Moment of Inertia: 0.07 kgfms²
Testing Temperature: 100° C. and 300° C.
Load on Clutch Cover: 400 kgf
The results are shown in FIG. 4.

Figure 4:
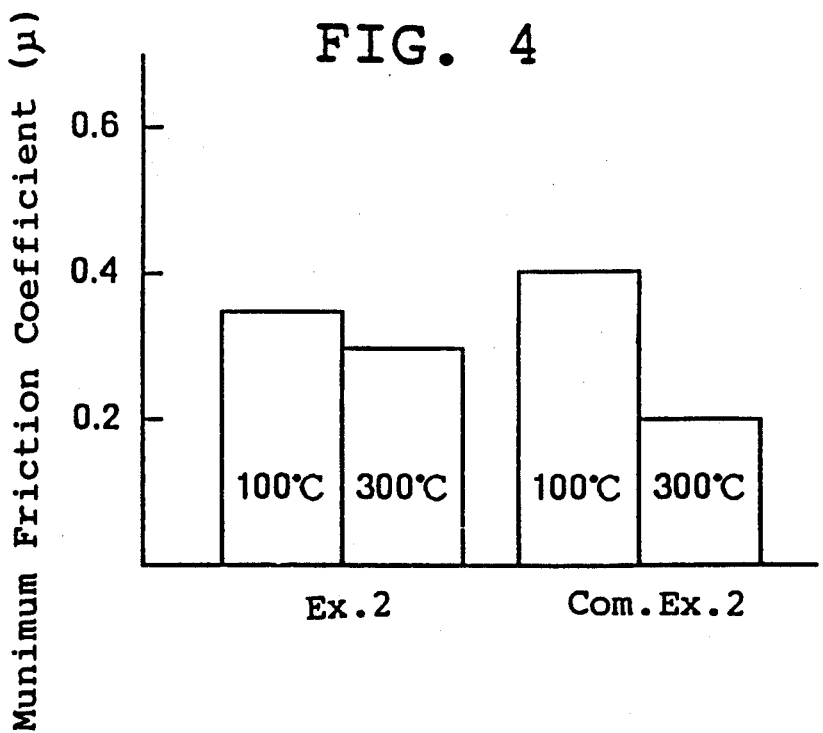
FIG. 4 is a column chart showing the results of the minimum friction coefficient ($\mu$) measurement which was carried out on the resin mold clutch facings of Example 2 according to the present invention and Comparative Example 2 by using a clutch dynamometer.

It is readily understood from FIG. 4 that the minimum friction coefficient ($\mu$) of the resin mold clutch facing of Example 2 is more than 0.29 when the temperature is 300° C. Accordingly, the minimum friction coefficient ($\mu$) of Example 2 is stable even at a high temperature.

On the other hand, the minimum friction coefficient ($\mu$) of Comparative Example 2 is 0.22 when the temperature is 300° C. Accordingly, the minimum friction coefficient ($\mu$) of Comparative Example 2 is not stable at all at a high temperature.

RPM AT BURST

Figure 5:
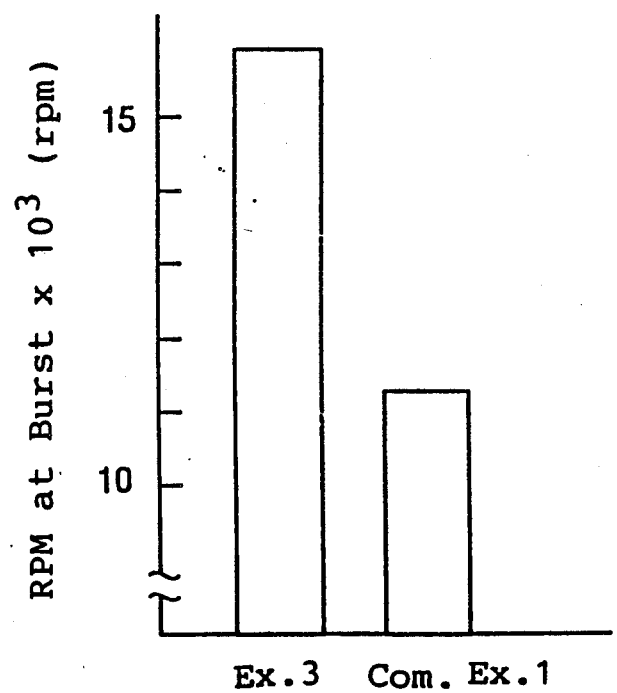
FIG. 5 is a column chart showing the results of the measurement of the rpm at burst which was carried out on the resin mold clutch facings of Example 3 according to the present invention and Comparative Example 1.

The rpm at burst was measured for the resin mold clutch facings of Example 3 and Comparative Example 1 at the temperature of 200° C. The results are shown in FIG. 5.

The resin mold clutch facing of Example 3 did not burst even at 16000 rpm, but the resin mold clutch facing of Comparative Example 1 burst at 11300 rpm.

EVALUATION 3

The evaluation results of the rpm at burst, the moldability, the deformation and the cost for the backup members of the resin mold clutch facings of Examples 1–3 and Comparative Examples 1 and 2 are shown in Table.

In the line of the rpm at burst of the Table, the double circles (⊙) show that the rpm at burst is 14000 rpm or more, the white circles (○) show that the rpm at burst is from 12000 to 14000 rpm, and the letter "x" shows that the rpm at burst is 12000 rpm or less, respectively.

In the line of the cost of the Table, the white circles (○) mean the least expensive cost, the triangle (△) means a fair cost, and the letter "x" means the most expensive cost, respectively.

In the line of moldability of the Table, the white circles (○) mean good moldability, the triangle (△) means fair moldability and the letter "x" mean bad moldability, respectively.

In the line of deformation of the Table, the white circles (○) show that the deformation is 0.5 mm or less and the triangles (△) show that the deformation is more than 0.5 mm, respectively.

All the backup member of Examples 1-3 showed good evaluation results, through the backup member of Example 3 having the heat resistance organic strand or yarn in a relatively larger content showed less performances in the moldability, deformation and cost than these of Examples 1 and 2. On the other hand, the resin mold clutch facing of Comparative Example 1 having the heat resistance organic fiber in a smaller content than Examples 1-3 was inferior not only in the rpm at burst but also in the moldability.

Having now fully described the invention, it will be apparent to one of ordinary skill in the art that many changes and modifications can be made thereto without departing from the spirit or scope of the invention as set forth herein.

What is claimed is:

1. A resin mold clutch facing integrally heat molded out of a resin mold base member forming a friction face and a backup member, wherein
   said resin mold base member consists essentially of, based on the total volume of said resin mold base member:
   a matrix composed of from 10 to 20 volume % of a glass fiber, from 5 to 30 volume % of at least one heat resistance organic fiber selected from the group consisting of a polyimide fiber, a polyamide fiber, and a polybenzonimidazole fiber, and from 5 to 25 volume % of at least one heat resistance inorganic fiber selected from a group consisting of a potassium titanate fiber, a ceramic fiber, a quartz fiber and a glassy silica fiber;
   5 to 15 volume % of an inorganic filler;
   5 to 20 volume % of a solid lubricant; and
   15 to 30 volume % of a resin binder; and
   said backup member consists essentially of a matrix composed of a glass strand or yarn and a heat resistance organic strand or yarn, and a binder composed of a resin and a rubber adhered to said backup member matrix, wherein said back-up member matrix is shaped in a spirally wound configuration.

2. A resin mold clutch facing according to claim 1, wherein said heat resistance inorganic fiber of said resin mold base member is a potassium titanate fiber.

3. A resin mold clutch facing according to claim 1, wherein said inorganic filler of said resin mold base member is composed of calcium carbonate and zirconium silicate.

4. A resin mold clutch facing according to claim 3, wherein the average grain diameter of said zirconium silicate is from 50 to 500 micrometers.

5. A resin mold clutch facing according to claim 1, wherein said solid lubricant of said resin mold base member is at least one selected from a group consisting of graphite, molybdenum disulfide, lead sulfide and antimony trisulfide.

6. A resin mold clutch facing according to claim 5, wherein said solid lubricant of said resin mold base member is granular graphite.

7. A resin mold clutch facing according to claim 1, wherein said resin binder of said resin mold base member is at least one selected from the group consisting of a phenol resin, a phenoxy resin, an epoxy resin and an unsaturated polyester resin.

8. A resin mold clutch facing according to claim 7, wherein said resin binder of said resin mold base member is a phenol resin.

9. A resin mold clutch facing according to claim 1, wherein said backup member is composed of from 20 to 60 volume % of said glass strand or yarn, from 20 to 80 volume % of said heat resistance organic strand or yarn, from 10 to 25 volume % of said resin, and from 5 to 25 volume % of said rubber, based on the total volume of said backup member.

10. A resin mold clutch facing according to claim 1, wherein said resin mold base member and said backup member employ the same kind of said heat resistance organic fiber and said heat resistance organic strand for yarn, respectively.

11. A resin mold clutch facing according to claim 1, wherein said glass fiber, said heat resistance organic fiber and said heat resistance inorganic fiber composing said matrix are a discontinuous fiber or filament of an interrupted length.

12. A resin mold clutch facing according to claim 11, wherein said glass fiber, said heat resistance organic fiber and said heat resistance inorganic fiber are dispersed at random in said matrix of said resin mold base member.

13. A resin mold clutch facing according to claim 1, wherein said resin mold base member further includes at least one friction regulating agent selected from the group consisting of cashew dust, rubber dust, elastomer, an aluminium powder, an iron powder and zinc powder.

14. A resin mold clutch facing according to claim 13, wherein the content of said friction regulating agent of said resin mold base member is from 1 to 8 volume % based on the total volume of said resin mold base member.

* * * * *

UNITED STATES PATENT AND TRADEMARK OFFICE
CERTIFICATE OF CORRECTION

PATENT NO. : 5,098,758

DATED : March 24, 1992

INVENTOR(S) : Harunobu Kani

It is certified that error appears in the above-identified patent and that said Letters Patent is hereby corrected as shown below:

Claim 1, column 9, line 41, change "polybenzonimidazole" to --polybenzoimidazole--.

Claim 5, column 10, line 11, change "molybdenium" to --molybdenum--.

Claim 10, column 10, line 34, change "for" to --or--.

Claim 13, column 10, line 50, change "aluminium" to --aluminum--.

Signed and Sealed this

Tenth Day of August, 1993

Attest:

MICHAEL K. KIRK

*Attesting Officer*      *Acting Commissioner of Patents and Trademarks*